(12) United States Patent
Ehrhart et al.

(10) Patent No.: US 7,730,703 B1
(45) Date of Patent: Jun. 8, 2010

(54) MODULAR DISC CUTTERBAR

(75) Inventors: Philip J. Ehrhart, Narvon, PA (US); Donald L. Osborne, Quarryville, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/546,202

(22) Filed: Aug. 24, 2009

(51) Int. Cl.
*A01D 34/00* (2006.01)
(52) U.S. Cl. ...................................... 56/13.6
(58) Field of Classification Search ............... 56/13.6, 56/6, 14.6, 15.2, 13.7, 255, 295, DIG. 6, 56/DIG. 14, DIG. 15, DIG. 20
See application file for complete search history.

(56) References Cited

U.S. PATENT DOCUMENTS

| 4,201,033 | A |   | 5/1980  | Meek et al. |
| 4,227,365 | A | * | 10/1980 | van der Lely et al. ......... 56/13.6 |
| 4,365,462 | A |   | 12/1982 | Werner et al. |
| 4,577,456 | A | * | 3/1986  | van der Lely et al. ......... 56/13.6 |
| 4,720,964 | A | * | 1/1988  | Ermacora et al. ............. 56/13.6 |
| 4,763,463 | A | * | 8/1988  | Ermacora et al. ............. 56/13.6 |
| 4,811,553 | A | * | 3/1989  | Ermacora et al. ............. 56/136 |
| 4,815,262 | A |   | 3/1989  | Koch et al. |
| 4,833,868 | A | * | 5/1989  | Ermacora et al. ............. 56/13.6 |
| 4,840,019 | A |   | 6/1989  | Pingry |
| 4,955,187 | A |   | 9/1990  | vam der Lely |
| 5,012,635 | A |   | 5/1991  | Walters et al. |
| 5,907,948 | A | * | 6/1999  | Ellis ........................... 56/13.6 |
| 5,964,079 | A |   | 10/1999 | Mellin et al. |
| 5,996,323 | A |   | 12/1999 | Campbell et al. |

FOREIGN PATENT DOCUMENTS

| EP | 503233 A1 * | 9/1992 |
| JP | 01225414 A * | 9/1989 |
| JP | 401225414 A | 9/1989 |
| WO | 9519693 A1 | 7/1995 |

* cited by examiner

*Primary Examiner*—Árpád Fábián-Kovács
(74) *Attorney, Agent, or Firm*—Patricia M. Sheldrake; John William Stader; Michael G. Harms

(57) ABSTRACT

A disc cutter module mounting structure for an agricultural header that enables one or more disc cutter modules and interconnection spacers to be temporarily laterally displaced a distance sufficient to disengage the transverse drive apparatus from a failed module thereby allowing the failed module to be removed from the header for repair or replacement. The laterally displaced modules and spacers need only be disconnected from the outboard drive shaft; lateral displacement is accomplished by the incorporation of slotted mounting guides on the spacers and a plurality of spaced-apart support tabs on the header frame. The mounting structure also supports the modules and spacers during the removal/replacement process reducing the need for jacks to support modules as they are being repositioned on the header.

14 Claims, 4 Drawing Sheets

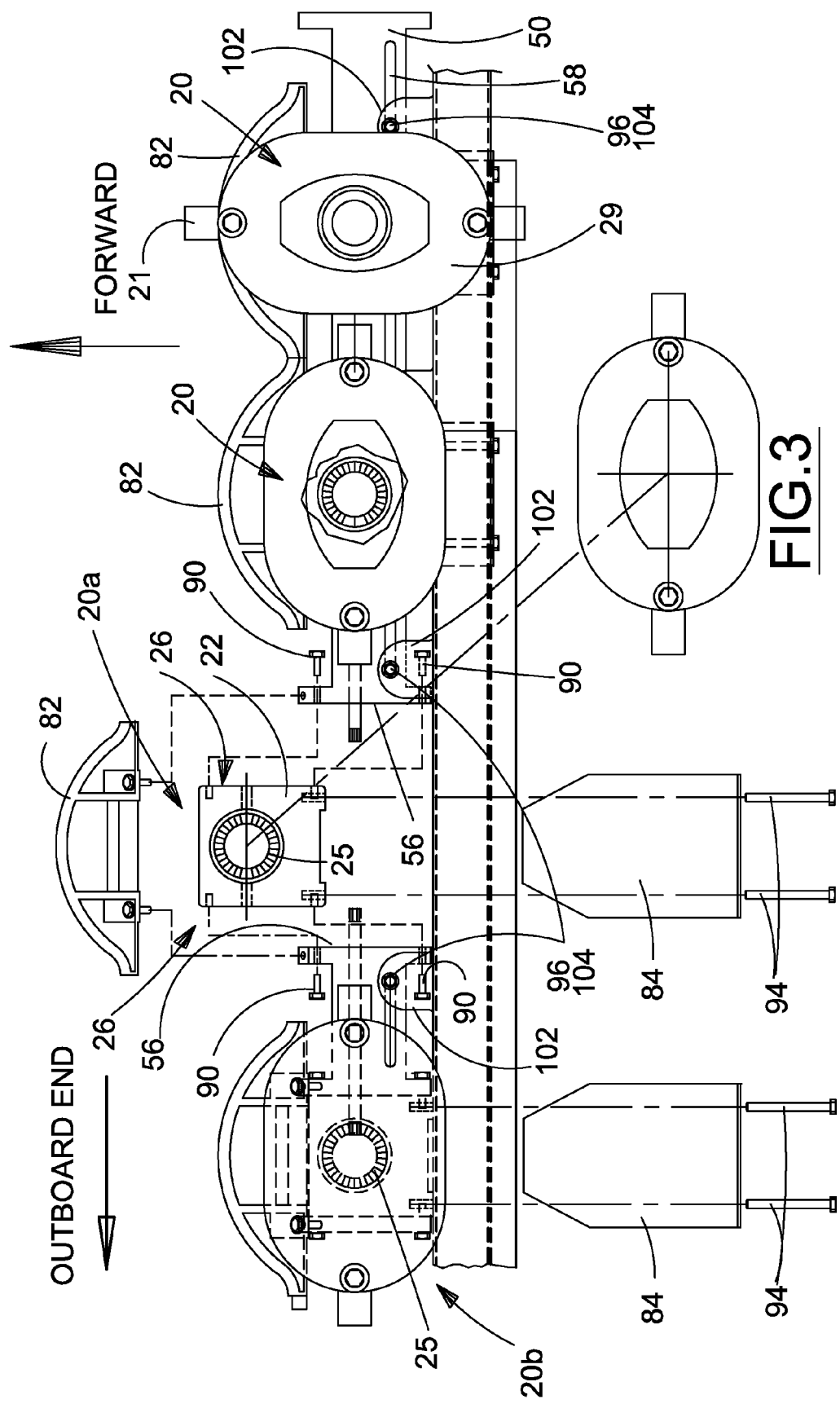

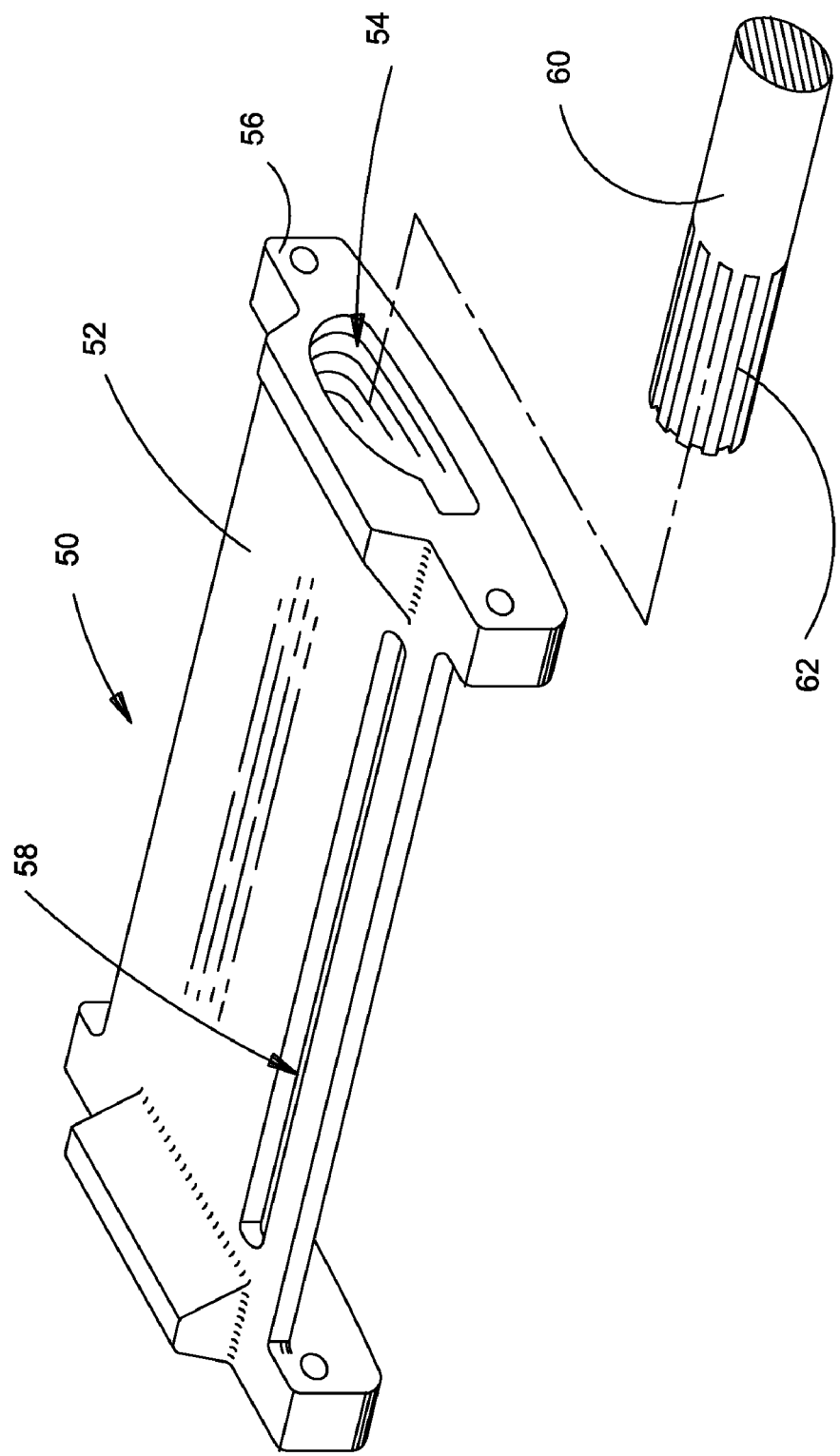

MODULAR DISC CUTTERBAR

BACKGROUND OF THE INVENTION

This invention relates generally to a machine for severing standing crops from the ground to initiate a harvesting process and, more particularly, to a rotary disc cutterbar having a preselected number of transversely oriented, rotatable discs having knives mounted thereon to sever standing crop by an impact action upon rotation of the discs.

Typical disc cutterbars used in agriculture include an elongated housing containing a train of meshed idler and drive spur gears, or a main power shaft or series of power shafts coupled by respective bevel gear sets, for delivering power to respective drive shafts for modular cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. For background information on the structure and operation of some typical disc cutterbars, reference is made to U.S. Pat. No. 5,996,323, issued to Campbell, the descriptive portions thereof being incorporated herein in full by reference.

Cutterbars frequently impact rocks and other obstructions in a field which can damage the cutterhead or the cutterhead driveline. Modular cutterhead designs allow an individual damaged cutterhead to be removed and replaced without affecting adjacent cutterhead modules. The modular design contains debris from gear failures within an individual module oil sump and reduces debris contamination of adjacent modules. However, replacing a single damaged cutterhead module is not an insignificant task requiring significant disassembly of the cutter bar in order to remove a damaged cutterhead from the cutterbar driveline because of intermediate drive shafts disposed between adjacent modules to transfer power laterally along the cutterbar.

It would be advantageous to have a cutterhead module mounting configuration which would reduce the degree of cutterbar disassembly necessary to allow an individual module to be removed and replaced. Further advantages would be realized by a cutterhead module mounting configuration that supports the modules during the disassembly process thereby lessening the need for temporary supports and improving safety during the module changeout process.

SUMMARY OF THE INVENTION

Accordingly, the present invention, in any of the embodiments described herein, may provide one or more of the following advantages:

It is an object of the present invention to provide a cutterhead module mount for a header that enables an individual module to be removed without disassembling a majority of the cutterhead modules from the cutterbar.

It is a further object of the present invention to provide a cutterhead module mounting configuration that enables modules and connecting spacers to be laterally displaced sufficiently to enable a failed cutterhead module to be removed without disassembling the adjacent cutterhead and spacer modules.

It is a further object of the present invention to provide a cutterhead module mounting configuration that supports all of the cutterhead modules while a failed module is removed and replaced thereby reducing the need for additional temporary module supports during the operation and improving safety during the operation.

It is a still further object of the present invention to provide an improved structure for mounting modular disc cutters on a header in a manner that enables easier removal and replacement of a damaged module that is durable in construction, inexpensive of manufacture, carefree of maintenance, easily assembled, and simple and effective to use.

These and other objects are achieved in accordance with the instant invention by providing an improved disc cutter module mounting structure for an agricultural header that enables one or more disc cutter modules and interconnection spacers to be temporarily laterally displaced a distance sufficient to disengage the transverse drive apparatus from a failed module thereby allowing the failed module to be removed from the header for repair or replacement. The laterally displaced modules and spacers need only be disconnected from the outboard drive shaft; lateral displacement is accomplished by the incorporation of slotted mounting guides on the spacers and a plurality of spaced-apart support tabs on the header frame. The improved mounting structure also supports the modules and spacers during the removal/replacement process reducing the need for jacks to support modules as they are being repositioned on the header.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a partial plan view of a cutterbar used in the header of FIG. 1 wherein the disc cutter modules and spacers are aligned as they would be when a cutter module is to be removed and replaced; and FIG. 4 is a perspective view of a cutterbar spacer module incorporating one embodiment of the present invention.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
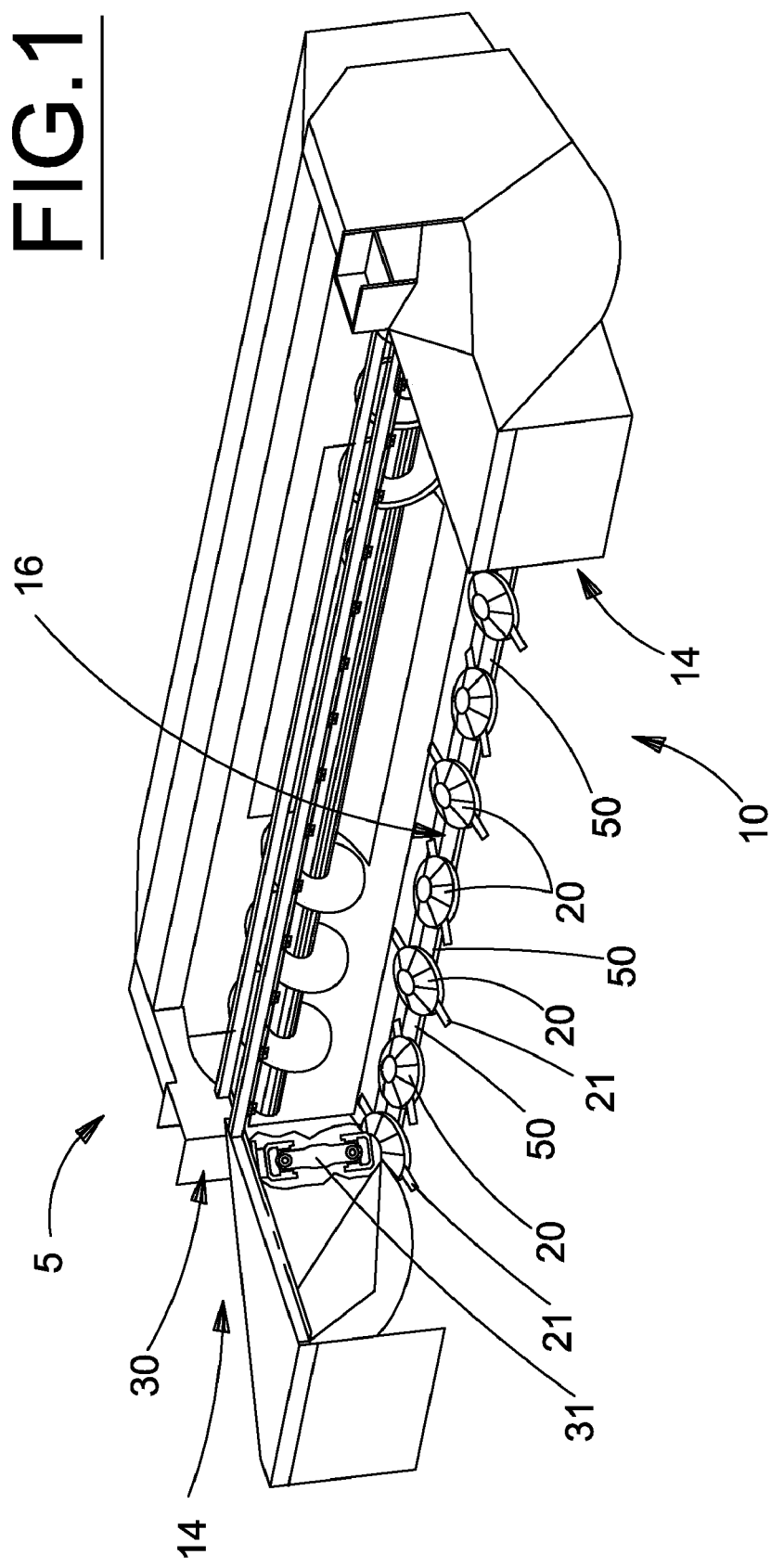
FIG. 1 is a partial perspective view of an agricultural disc header of the type on which the present invention is useful.

Referring now to the drawings and particularly to FIG. 1, a header 5 having a disc cutterbar 10 of the type on which the present invention finds utility is presented. Disc cutterbars have been utilized in agricultural harvesting implements for many years. Each disc cutterbar includes a plurality of transversely spaced disc cutter modules 20 driven for rotation about a generally vertical axis. Each disc cutter module 20 has two or three knives 21 pivotally mounted on the periphery thereof to sever standing crop from the ground through an impact action. The cutterbar 10 is configured with a pair of opposing outboard ends 14 with a centrally positioned midpoint 16. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Now referring to FIGS. 1 through 4, modular disc cutterbar 10 is made up of alternating segments comprising disc cutter modules 20 and spacer modules 50, shown, which can be joined at flange faces 26, 56 with retention mechanisms, such as threaded fasteners 90. The spacer modules are configured to provide the desired center-to-center spacing between adjacent disc cutter modules 20. Each spacer module 50 is preferably formed as a cast housing 52 having a transverse passageway 54 extending therethrough to allow for the passage of a transfer shaft 60 used for transferring drive power between adjacent cutter modules, though other fabrication methods may be used with functionally similar results. The spacer modules 50 are uniformly sized and configured so that an individual spacer module may be used at any spacer location along the transverse length of the cutterbar 10. Reference is made to U.S. Pat. No. 5,996,323, issued to Campbell et al., for additional background information on the structure and operation of modular disc cutterbars, the descriptive portions thereof being incorporated herein in full by reference.

Each disc cutter module 20 includes a hollow cast housing 22 having a specific shape to retain a low profile and to establish an oil reservoir 23 therewithin. The housing 22 supports a drive mechanism 25 to rotate a disc hub 29 positioned for rotational movement above the housing 22. Drive mechanisms 25 of adjacent disc cutter modules 20 are connected by transfer shafts 60. Motive power for the cutterbar is typically provided from a driver 30 disposed in the header via a shaft 31 to the cutter modules 20 positioned at the outboard ends 14 of the cutterbar 10. Transfer shafts 60 typically engage the drive mechanism 25 in each adjacent cutter module with a splined interface 62 at each end of the transfer shaft 60. Separating the transfer shafts 60 from the drive mechanism 25 requires lateral displacement of the shaft 60, the drive mechanism 25, or both. It is the pull-out distance of the splined end of the transfer shaft 60 that determines the amount of lateral displacement required to remove a single cutter module 20 from the cutterbar. An inboard-mounted cutter module must be disengaged from the transfer shafts on either side of the module, therefore, the amount of lateral displacement necessary must be sufficient to disengage two transfer shafts from the splined-end connections in the cutter module drive mechanism.

Figure 2:
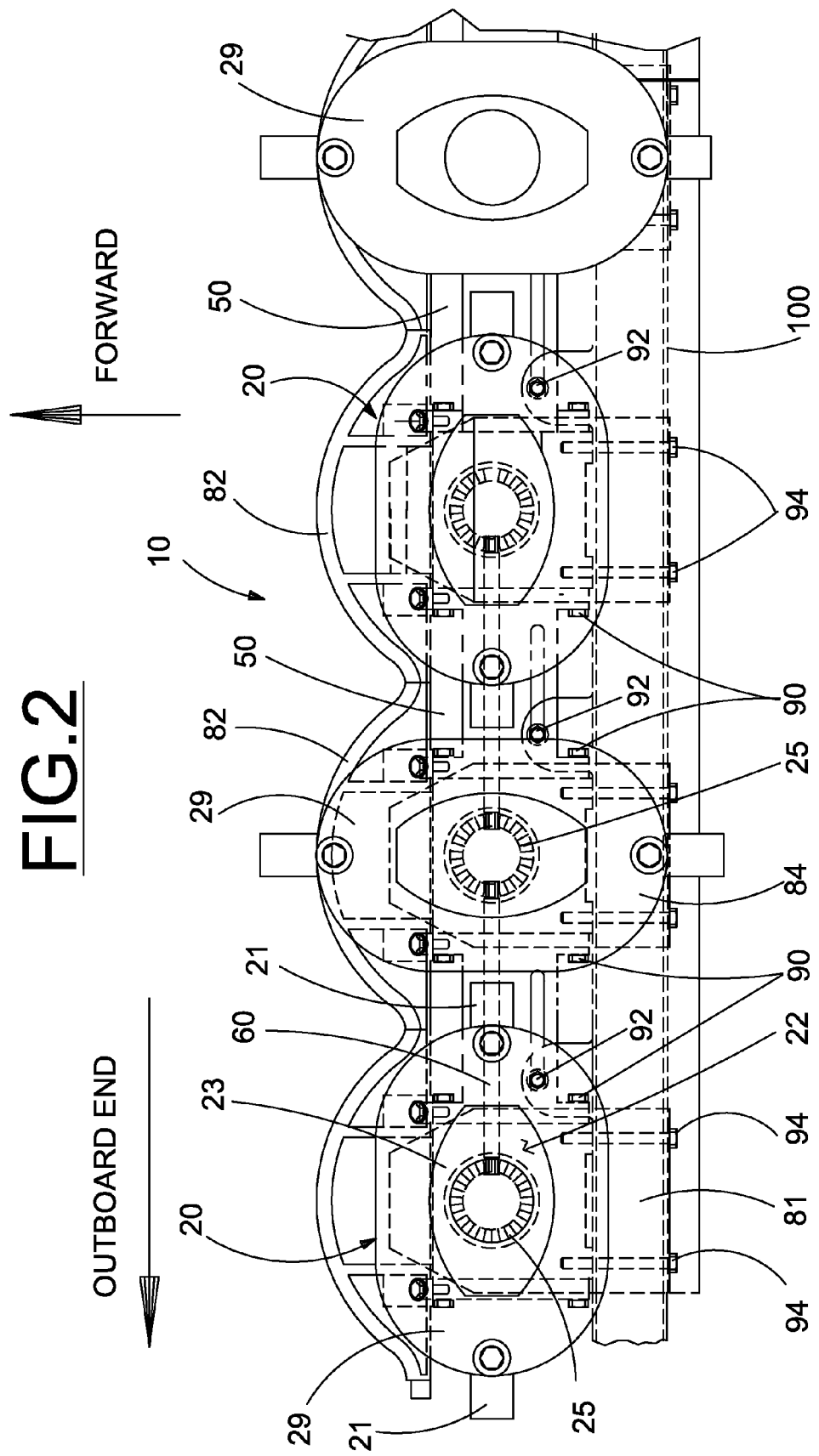
FIG. 2 is a partial plan view of a cutterbar used in the header of FIG. 1, incorporating the improvements of the instant invention wherein the disc cutter modules and spacers are aligned as they would be when the cutterbar is operational.

FIG. 2 shows the cutterbar 10 as configured for operation in which adjacent disc cutter modules 20 and spacer modules 50 are connected with transfer shafts 60 mechanically interconnecting the drive mechanisms 25. Adjacent cutter and spacer modules 20, 50 include mating flanges 26, 56 that are abutted and secured by bolts 90 or other conventional means to make up the cutterbar. The assembly of modules is then supported in the vertical direction by support fasteners 96. Support fasteners 96 may be vertically or horizontally oriented or even angled in a plane parallel to the direction of travel and still provide the necessary vertical support for the module assembly. The cutterbar 10 also incorporates a rock guard 82 positioned forwardly to protect the leading edge of the cutter module 20 and a skid shoe 84 positioned to protect the lower portions of the cutter module housing 22 from rocks and other potentially damaging obstacles that might be impacted by the cutterbar as it is propelled across a field. The rock guards 82 and skid shoes 84 are removable and are typically required to be removed in order to remove a cutter module. Skid shoe rear connectors 94 secure the skid shoe to the cutterbar frame 100, secure the rearward side of the cutter module 20 to the frame, and define the lateral position of each disc cutter module relative to the frame 100. Separate connectors for the skid shoe 84 and the rear of the cutter module 20 could be used without departing from the spirit and intent of the invention.

Though the embodiment presented shows vertically oriented fasteners (support fasteners 96) engaging slotted openings 58 and generally horizontally-aligned fasteners (rear connectors 94) providing the lateral position of modules in the assembled cutterbar, one skilled in the art will recognize that a spacer module having a slotted opening engaged by a fastener which also connects to the cutterbar frame will provide vertical support of the modules when the fasteners are loosened for lateral displacement, regardless of the specific orientation of the fasteners. Similarly, the fasteners used to secure the modules in place laterally may also be oriented in various ways so long as the modules may be fixed into lateral position. Such obvious alterations do not depart from the spirit and intent of this invention and are contemplated by this disclosure.

Disassembly of the cutterbar to replace a damaged cutter module heretofore required substantial disassembly of the cutterbar assembly which left most components unsupported by the header frame and thus required jacks and other support means to remove a module. As can be seen in FIGS. 3 and 4, the present invention improves the process for removing and replacing a module by altering the connection between the modules and the cutterbar support frame 100. Instead of fastening the modules to the header frame directly as was previously known, the modules are connected to a support frame 100 that includes a series of forwardly projecting, spaced apart module support appendages 102. The rearward ends of the modules are fastened to the support frame in a manner that transversely aligns the modules along the transverse width of the cutterbar. Support frame 100 is conveniently shown as a single member, but may also comprise multiple members or simply a series of appendages 102 arranged to receive module support connectors 96.

The support appendages 102 are generally planar structures, each featuring a vertically aligned mounting hole 104 for receiving a module support connector 96. The module support connectors 96 engage a guide structure 58, preferably a slotted guide, in each spacer module that is transversely aligned with the cutterbar. Support connectors 96 may be configured in a first condition or a second condition. In the first condition, the support connector 96 applies a tension force between the appendage and the adjacent spacer module to retain the two in a fixed position relative to one another. In the second condition, the support connector 96 is detensioned (also referred to as a released condition) and allows relative movement between the spacer module 50 and the appendage 102 within the limits of the guide structure 58. The slotted opening of the guide structure 58 allows lateral motion of the spacer modules 50 and connected cutter modules 20 relative to the support appendage mounting hole 104 and the associated support connector 96. The support appendages 102 are also sufficiently spaced apart to enable the cutter module disposed between two adjacent appendages to be laterally displaced. The module housing 22 is generally aligned coplanar with the support frame 100 and support appendages 104 such that contact between the transverse sides of the module and the edges of the adjacent support appendages 104 defines the extent of module lateral displacement. Lateral displacement of the cutter module must be sufficient to enable the adjacent transfer shafts 60 to be disengaged from the drive mechanism 25 so that the module may be extracted forwardly in relation to the support frame.

The process for removing a module is improved as only the module to be removed is fully detached from the header. Once the header is raised and locked into position, the disc hub 29, knives 21, rock guard 84, and skid shoe 82 of the module to be removed (20a in FIG. 3) are removed. Removal of the skid shoe rear connectors 94 also removes the primary connection between the module 20a and the support frame 100, which will allow the module to be removed. Removing the module connectors from both sides of the module to be removed 20a will release the module 20a from the adjacent spacer modules 50 and allow modules to be laterally displaced. The drive shaft 31 from the nearest outboard cutter module is disconnected from the outboard cutter module. Support fasteners 96 for shifted modules (20b in FIG. 3) between the module to be removed 20a and the nearest outboard end are loosened and the rear connectors 94 for the shifted modules 20b are removed to allow the shifted modules 20b to be laterally displaced so that transfer shafts 60 can be accessed. As the support fasteners 96 are merely loosened, not removed, they continue to provide vertical support for the modules while allowing lateral movement, thus eliminating the need for separate jacks or other means of supporting the modules during the procedure. The cutter modules 20b and spacers outboard of the module to be removed 20a may now be laterally slid in the outboard direction to disengage the transfer shafts 60 on either side of the removal module 20a until the module 20 can then be extracted from the cutterbar. Once removed, it can be repaired or replaced with another module and the cutterbar restored to an operable configuration.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A modular disc cutterbar for an agricultural header comprising:
   a module support structure connected to the header, the support structure extending for a length along an axis transverse to the header;
   a plurality of disc cutter modules;
   at least one spacer module modularly connecting two adjacent cutter modules;
   a plurality of elongate transfer shafts connecting said plurality of cutter modules, each said transfer shaft having an axial length spanning between opposing ends where each end of each transfer shaft having an axially engaging interface with each respective cutter module
   an elongate guide structure disposed in each said spacer module and an engaging mechanism, said guide structure and said engaging mechanism for fixing the position of each of said at least one spacer along the length of said support structure wherein said mechanism permits selective displacement of each of said at least one spacer within a fixed range along said length of said support structure; and
   a plurality of appendages connected to and projecting from said support structure, each said appendage configured to receive one of said engaging mechanisms and forming a movable connection for transverse displacement of each of said plurality of cutter modules.

2. The cutterbar of claim 1, wherein said plurality of appendages forwardly project from said support structure.

3. The cutterbar of claim 1, further comprising each end of each transfer shaft having an axially engaging interface with each respective cutter module and having an axial pullout distance for disengaging an end of each said transfer shaft from a respective cutter module sufficient to enable the respective cutter module to be removed from the cutterbar, wherein said pullout distance determines a minimum dimension of said fixed range.

4. The cutterbar of claim 3, wherein said engaging mechanism comprises a fastener for simultaneously engaging one of said plurality of appendages and said guide structure of one of said at least one spacer module, said fastener being selectively configurable in a first condition and a second condition, wherein said at least one spacer module may be selectively displaced for a finite distance along said axis when said fastener is in said first condition while being vertically supported by said fastener connection to said support structure.

5. The cutterbar of claim 4, wherein said guide structure is a slot in said spacer module.

6. A disc cutterbar for an agricultural header comprising:
   a plurality of transversely spaced cutter modules, each adjacent pair of cutter modules having a power transfer shaft spanning therebetween;
   a plurality of spacer modules for connecting said plurality of cutter modules and housing said transfer shaft, each said spacer module having a transversely aligned elongate guide structure, one of said plurality of spacer modules disposed between each adjacent pair of cutter modules; and
   a transverse support connected to the header, said support having generally opposing outboard ends, a plurality of cutter module lateral retainers, and a plurality of module mounting structures mounted therebetween, said lateral retainers being selectively configurable in a fixed or a released condition, said mounting structures configured to engage said guide structures and to vertically support said cutter modules and said spacer modules in a manner enabling lateral displacement of an assembly comprising a pre-selected number of cutter modules and spacer modules when said lateral retainers are in said release condition, whereby lateral displacement of said assembly toward an outboard end and away from an inwardly disposed failed cutter module without separating said cutter and spacer modules from one another enables said inwardly disposed failed cutter module to be removed from the cutterbar; and
   each said mounting structure further comprises at least one appendage projecting from said support beam, each of said at least one appendage having a receptacle for receiving a connector, said connector simultaneously engaging said receptacle and one said slotted guide in a manner enabling said spacer module to be selectively transversely displaced.

7. The cutterbar of claim 6, wherein each said module mounting structure is configured to enable lateral displacement of a respective cutter module between a connection position and a removal position wherein lateral displacement is sufficient to enable said cutter module to disengage from drive apparatus.

8. The cutterbar of claim 7, wherein said transfer shafts rotationally connect adjacent cutter modules, each said transfer shaft engaging said cutter module in a torque transferring, axially movable configuration having a pullout dimension which enables said shaft to be removed from said cutter module, said slotted guides enabling lateral displacement of said predetermined number of spacer modules and cutter modules that is at least two times said pullout dimension.

9. The cutterbar of claim 8, wherein said connectors vertically support said spacer modules while enabling lateral displacement of said spacer modules and said cutter modules.

10. The cutterbar of claim 9, wherein said elongate guide structure is a slotted opening in said spacer module.

11. The cutterbar of claim 9, wherein said at least one appendage projects forwardly from said transverse support.

12. A method of replacing a cutter module on a cutterbar used on an agricultural header comprising the steps
    providing a transverse cutterbar support having generally opposing outboard ends;
    providing a plurality of appendages projecting from the support, each appendage having a receptacle;
    providing plurality of cutter modules transversely spaced between the outboard ends, each adjacent pair of cutter modules being having a power transfer shaft spanning therebetween;
    providing a plurality of lateral retainers for each cutter module to laterally fix each said cutter module in position relative to the cutterbar support, each retainer selectively configurable in a fixed or a released condition;
    providing a plurality of spacer modules for connecting said plurality of cutter modules and housing said transfer shaft, one of said plurality of spacer modules disposed between each adjacent pair of cutter modules, each said spacer module having a transversely aligned elongate guide;
    providing a plurality of connectors for simultaneously engaging each of the receptacles and respective slotted guides to vertically support the spacer modules, the connectors configurable in a fixed or a released condition;
    selecting an inboard cutter module to be replaced;
    releasing the lateral retainers for the cutter modules between the inboard cutter module and the nearest outboard end;
    disconnecting the spacer modules on each side adjacent to the inboard cutter module from the inboard cutter module;
    reconfiguring the connectors to the released condition;
    laterally displacing the cutter modules and the spacer modules between the nearest outboard end and the spacer outboardly adjacent to the inboard cutter module as an assembly to disengage the transfer shafts adjacent to the inboard cutter module from the inboard cutter module; and
    removing the inboard cutter module from the cutterbar.

13. The method of claim 12, further comprising the step of:
    providing a torque transferring, axially movable shaft configuration at each interface of the transfer shafts and cutter modules, the shaft configuration having a pullout dimension which enables said shaft to be removed from said cutter module, the slotted guides enabling lateral displacement of the laterally displaced module assembly that is at least two times the pullout dimension.

14. The method of claim 13, further comprising the step of:
    vertically supporting retaining by the connectors the laterally displaced module assembly as the module assembly is being laterally displaced.

* * * * *